3,252,964
WATER-SOLUBLE CATIONIC AZO-DYESTUFFS
Otto Fuchs, Frankfurt am Main, and Friedrich Ische, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Apr. 1, 1963, Ser. No. 269,792
Claims priority, application Germany, Apr. 5, 1962, F 36,476
7 Claims. (Cl. 260—152)

The present invention relates to water-soluble cationic azo-dyestuffs and to a process for preparing them.

We have found that water-soluble cationic azo-dyestuffs of the general Formula 1

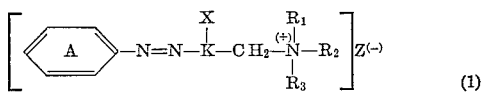
(1)

in which K represents the radical of a coupling component of the benzene or naphthalene series which besides X may contain further substituents, X represents a hydroxy or amino group being in ortho or para position to the grouping

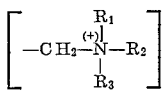

the benzene nucleus A may be substituted by alkyl, aryl, alkoxy, hydroxy or arylazo groups, $R_1$, $R_2$ represent hydrogen atoms, alkyl, cycloalkyl or aryl groups, and $R_1$ and $R_2$ together with the quaternary nitrogen atom may be members of a heterocyclic ring, and $R_3$ stands for an alkyl group, can be prepared by reacting azo compounds of the general Formula 2

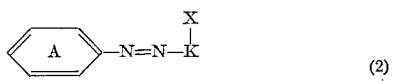
(2)

in which K and X are defined as above and the benzene nucleus A may be substituted as described above, and which in the radical of the coupling component K contains in at least one ortho or para position to X a free hydrogen atom, with formaldehyde and ammonia or a primary or secondary aliphatic, cycloaliphatic, aromatic or heterocyclic amine or a salt thereof, and treating the thus obtained compounds of the general Formula 3

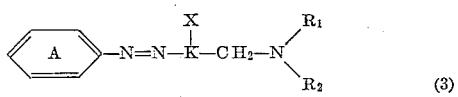
(3)

in which K, X, $R_1$ and $R_2$ are defined as above and the benzene nucleus A may be substituted as described above, with an alkylating agent.

Preferred dyestuffs are the water-soluble cationic azo-dyestuffs of the formula

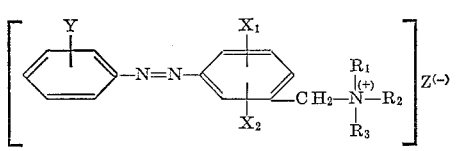

wherein Y is a hydrogen, lower alkyl or phenylazo group, $X_1$ is a hydroxyl or amino group and is in a position other than meta- to the azo group, $X_2$ is a hydrogen, hydroxyl, amino or lower alkyl group, $R_1$ and $R_2$ are each a hydrogen, lower alkyl, cycloalkyl, benzyl, phenyl, and together with the quaternary nitrogen atom, piperidyl or morpholinyl group, $R_3$ is a lower alkyl group, and Z is an anion.

The substituent X in the above general Formulae 1, 2 and 3 may have a double function inasmuch as it is a) the substituent of the coupling component which is necessary for the coupling with a diazonium salt and b) simultaneously the substituent which according to the present invention is necessary for the aminomethylation provided that after the coupling reaction at least one ortho or para position with regard to the substituent X is still unsubstituted.

Suitable coupling components are, for example, phenol, resorcin, hydroquinone, cresol, phenolhalides, nitrophenols, aniline, m-phenylenediamine, 2-methylaniline, anilinehalides, nitranilines, aminophenols, anisidine, phenetidine.

As amines may be used, for example, aliphatic amines, such as methylamine, ethylamine, propylamine, butylamine, dimethylamine, diethylamine, dipropylamine, dibutylamine or alkylamines containing hydroxyalkyl groups, such as diethanolamine, furthermore aromatic amines, such as aniline, aminobenzenes or naphthylamines being substituted by halogen atoms, alkyl or alkoxy groups, heterocyclic amines, such as piperidine or morpholine, or aralkylamines, such as benzylamine. Instead of the free amines there may also be used the salts, such, for example, as the hydrochlorides, sulfates or acetates.

The molar ratio of starting dyestuff component to amine is generally 1:1, however, the amine may also be used in excess.

The formaldehyde is suitably used in a molar ratio of 1:1 calculated on the amine, the application of an excess of formaldehyde or amine being possible. The formaldehyde can be used in different form, for example, in aqueous solution or in the form of a polymer, such as parafromaldehyde.

The reaction takes place at a temperature within the range of 70° C. and 150° C., preferably between about 100° C. and 140° C. The individual optimum temperature depends upon the reaction component used.

The reaction can be carried out in an aqueous medium or in an inert organic solvent, such, for example, as dimethyl formamide, ethylene glycol, diethylene glycol, diethylene glycol monoethyl ether, dioxane or tetrahydrofurane. When the reaction is carried out at elevated temperatures, it may be necessary, depending on the reactants or the reaction medium used, to work under pressure in an autoclave.

The compound of general Formula 3 is isolated in such a manner that the reaction mixture is poured into water or a low molecular weight alcohol, preferably methanol, and the precipitated product is filtered off. The compounds of general Formula 3 thus obtained are soluble in dilute aqueous acid and can be used from an aqueous-acid solution or aqueous dispersion for dyeing synthetic fiber material of, for example, polyacrylonitrile, polyvinylidene cyanide, polyamide, polyethylene terephthalate, cellulose acetate or cellulose triacetate.

The compounds of general Formula 3 thus obtained are quaternized in known manner by reacting them with alkyl halides, such as methyl iodide, dialkyl sulfates, such as dimethyl sulfate or diethyl sulfate or with para-toluenesulfonic acid alkyl esters, such as para-toluenesulfonic acid methyl ester. The cationic final products are generally obtained in a good to very good yield.

The cationic dyestuffs so obtained which correspond to the general Formula 1 are soluble in water and yield from an aqueous bath fast dyeings or prints on synthetic fiber materials, such, for example, as polyacrylonitrile, polyvinylidene cyanide, polyamide, polyethylene terephthalate, cellulose acetate or cellulose triacetate. Their very good fastness to light and washing on fiber material of polyacrylonitrile, their good fastness to thermofixation and good affinity to polyethylene terephthalate fibers are of particular interest.

The following examples serve to illustrate the invention but they are not intended to limit it thereto, the parts and percentages being by weight unless otherwise stated.

Example 1

20 parts of 4-amino-azobenzene were dissolved in 100 parts of dimethyl formamide and mixed with 7 parts of paraformaldehyde and 7 parts of piperidine. After heating for 4 hours at 120° C., the mixture was diluted with 400 parts of water. The precipitated product was filtered off, washed and dried. In order to purify the product, it was dissolved in little glacial acetic acid, diluted with 500 parts of water, separated by filtration from a small quantity of undissolved matter, and the filtrated clear solution was poured into an excess of dilute sodium carbonate solution. After filtration, washing and drying, 20 parts of 5 - (piperidino - methyl) - 4 - aminoazobenzene were obtained. From an aqueous weakly acetic acid solution, this compound dyed fibers of polyacrylonitrile, polyvinylidene cyanide and aromatic polyesters orange yellow tints.

10 parts of the compound described above were dissolved in 50 parts of dimethyl sulfate, and the solution was heated for 2 hours at 100° C. After cooling, the solution was diluted with 500 parts of ether. The precipitated product was filtered off, washed with ether and dried. The thus obtained quaternary salt of the formula

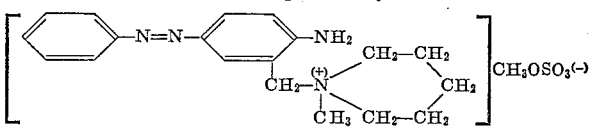

dyed fibers of polyacrylonitrile, polyvinylidene cyanide and polyethylene terephthalate orange tints.

When using instead of piperidine equimolecular amounts of morpholine, n-butylamine, benzylamine, aniline or N-methylaniline, aminomethyl azo-dyestuff compounds and salts thereof were obtained which corresponded to the compounds described above as regards their chemical and tinctorial properties.

Example 2

31.5 parts of 4-(2'-hydroxy-3'-methyl-phenylazo)-azobenzene were dissolved in 100 parts of ethyl diglycol and heated for 5 hours at 140° C. with 6 parts of paraformaldehyde and 13 parts of piperidine. After diluting the reaction mixture with water, filtering off the product, washing and drying, a dyestuff of the formula

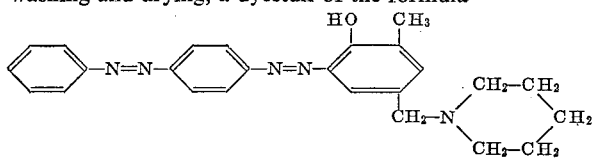

was obtained which from an aqueous dispersion or weakly acetic acid solution dyed polyacrylonitrile, polyvinylidene cyanide and polyethylene terephthalate fibers orange tints.

When the dyestuff obtained was quaternized with dimethyl sulfate according to Example 1, paragraph 2, 34 parts of the water-soluble cationic dyestuff of the formula

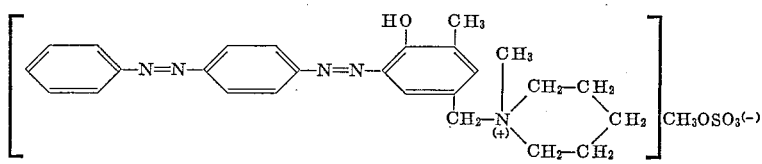

were obtained. This dyestuff dyed fibers of polyacrylonitrile, polyvinylidene cyanide, polyamides or polyethylene terephthalate orange tints.

Example 3

19.8 parts of 4-hydroxy-azobenzene, 6 parts of paraformaldehyde and 16 parts of dimethylamine hydrochloride were heated for 8 hours at a temperature within the range of from 140° C. to 150° C. in 150 parts of dimethyl formamide. The mixture was then diluted with water to obtain 750 parts, the precipitated product was filtered off, washed and dried. There was obtained the 3-(dimethylamino-methyl)-4-hydroxyazobenzene which from an aqueous acetic acid solution dyed fabrics of polyacrylonitrile, polyvinylidene cyanide, polyamide, polyethylene terephthalate or cellulose acetate yellow tints.

By quaternization with dimethyl sulfate as described in Example 1, paragraph 2, there were obtained 21 parts of the water-soluble cationic dyestuff of the formula

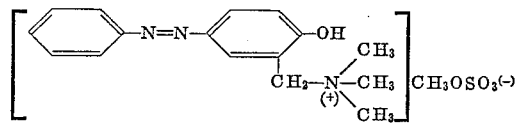

The dyestuff dyed fabrics of the afore-mentioned materials likewise yellow tints.

Example 4

21.4 parts of 2,4-dihydroxy-azobenzene were heated for 4 hours at 140° C. in an autoclave with 20 parts of a 30% aqueous solution of formaldehyde, 13 parts of piperidine and 100 parts of water. The reaction mixture was cooled, the precipitated product was filtered off, washed and dried. There was obtained the 3-(piperidino-methyl)-2,4-dihydroxyazobenzene which from an aqueous dispersion or aqueous acetic acid solution dyed fibers of polyacrylonitrile, polyvinylidene cyanide or polyethylene terephthalate yellow tints.

By quaternization in an excess of para-toluenesulfonic acid methyl ester at 100° C., 30 parts of the water-soluble cationic dyestuff of the formula

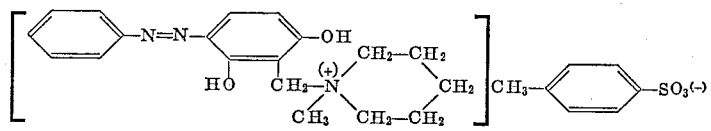

were obtained. This dyestuff dyed the fibers specified above likewise yellow tints.

When using instead of 2,4-dihydroxy-azobenzene equimolecular amounts of 2-hydroxy-5-methyl-azobenzene, a yellow dyestuff was obtained which corresponded to the product described above as regards the chemical and tinctorial properties.

Example 5

22.4 parts of 4-amino-2',3-dimethyl-azobenzene were dissolved in 100 parts of glycol and heated for 4 hours at 140° C. with 10 parts of paraformaldehyde and 10 parts of piperidine. After precipitation with 200 parts of methanol, filtration, washing with methanol and drying, the 5-(piperidino-methyl)-4-amino-2',3-dimethyl-azobenzene was obtained which was soluble in dilute acetic acid and dyed fibers of polyacrylonitrile, polyvinylidene cyanide or polyesters yellow tints.

By quaternization with dimethyl sulfate as described in Example 1, paragraph 2, there were obtained 22 parts of the water-soluble cationic dyestuff of the formula

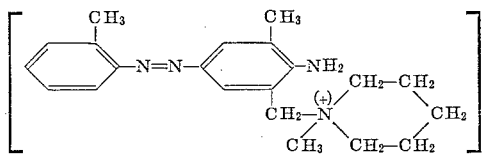

From an aqueous solution, the dyestuff dyed the aforecited synthetic fibers yellow tints.

Example 6

23.6 parts of 4,6-diamino-3-methylazobenzene, 6 parts of paraformaldehyde, 10 parts of diethylamine and 100 parts of water were heated for 4 hours at 140° C. in an autoclave. The reaction mixture was then cooled, the precipitated product was filtered off, washed with water and dried. There was obtained the 5-(diethylamino-methyl)-4,6-diamino-3-methyl-azobenzene which from an aqueous acetic acid solution dyed fibers of polyacrylonitrile, polyvinylidene cyanide and polyesters yellow tints.

The dry product obtained was introduced into 100 parts of diethyl sulfate and heated at 100° C. until a worked up specimen became water-soluble. The product was then diluted with acetone, filtered off with suction, washed and dried. From an aqueous solution, the dyestuff obtained which corresponded to the formula

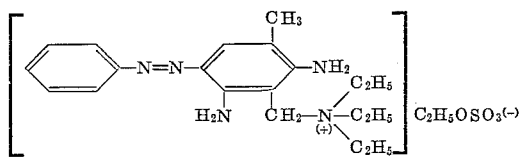

dyed the afore-mentioned fibers yellow tints.

An equal result was obtained when the quaternization was carried out with methylene chloride, methylene bromide or methylene iodide, superatmospheric pressure having been applied when methyl chloride or methyl bromide was used. In these cases, the cationic dyestuff contained an anion $Cl^{(-)}$, $Br^{(-)}$ or $I^{(-)}$.

We claim:

1. A water-soluble cationic azo-dyestuff of the formula

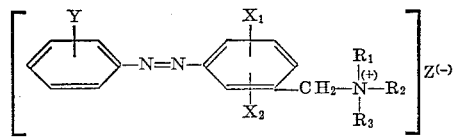

wherein Y is a hydrogen, lower alkyl or phenylazo group, $X_1$ is a hydroxyl or amino group and is in a position other than meta- to the azo group, $X_2$ is a hydrogen, hydroxyl, amino or lower alkyl group, $R_1$ and $R_2$ are each a hydrogen, lower alkyl, cycloalkyl, benzyl, phenyl, and together with the quaternary nitrogen atom, piperidyl or morpholinyl group, $R_3$ is a lower alkyl group, and Z is an anion.

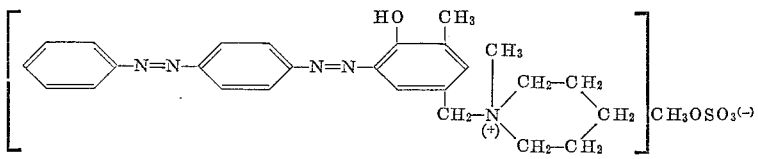

2. The water-soluble cationic azo-dyestuffs as claimed in claim 1, wherein $Z^{(-)}$ represents a member of the group consisting of chloride, bromide, iodide, $CH_3OSO_3^{(-)}$, $C_2H_5OSO_3^{(-)}$ and

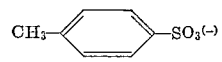

3. The water-soluble cationic azo-deystuff having the formula

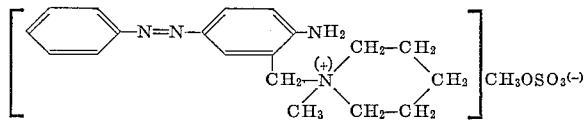

4. The water-soluble cationic azo-dyestuff having the formula

5. The water-soluble cationic azo-dyestuff having the formula

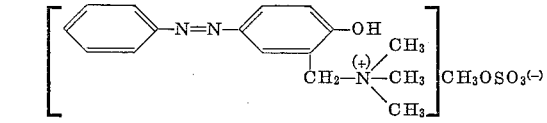

6. The water-soluble cationic azo-dyestuff having the formula

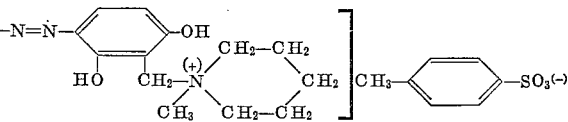

7. The water-soluble cationic azo-dyestuff having the formula

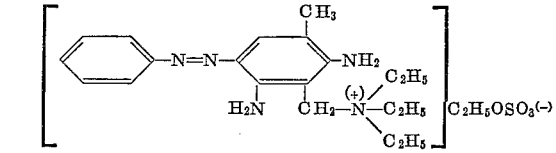

References Cited by the Examiner

UNITED STATES PATENTS

| | | | |
|---|---|---|---|
| 2,234,036 | 3/1941 | Zitschner et al. | 260—152 XR |
| 2,263,387 | 11/1941 | Houk et al. | 260—152 XR |
| 2,498,874 | 2/1950 | Bock et al. | 260—156 XR |

CHARLES B. PARKER, *Primary Examiner.*

FLOYD D. HIGEL, REYNOLD J. FINNEGAN,
*Assistant Examiners.*